(12) United States Patent
Zimmer et al.

(10) Patent No.: US 9,109,730 B2
(45) Date of Patent: Aug. 18, 2015

(54) METHOD FOR ASSEMBLING BLOW MOLDED TUBES

(71) Applicants: Ronald A. Zimmer, Dewitt, IA (US); Annah Preloger, Grand Mound, IA (US)

(72) Inventors: Ronald A. Zimmer, Dewitt, IA (US); Annah Preloger, Grand Mound, IA (US)

(73) Assignee: Custom-Pak, Inc., Clinton, IA (US)

(*) Notice: Subject to any disclaimer, the term of this patent is extended or adjusted under 35 U.S.C. 154(b) by 3 days.

(21) Appl. No.: 13/675,754

(22) Filed: Nov. 13, 2012

(65) Prior Publication Data

US 2014/0131531 A1 May 15, 2014

(51) Int. Cl.
*F16L 13/00* (2006.01)
*F16L 25/10* (2006.01)
*A47G 29/122* (2006.01)

(52) U.S. Cl.
CPC .............. *F16L 25/10* (2013.01); *A47G 29/1216* (2013.01); *F16L 13/00* (2013.01); *Y10T 29/49826* (2015.01)

(58) Field of Classification Search
CPC ........... F16L 13/00; F16L 35/00; F16L 37/56; F16L 37/098; F16L 25/10
USPC ............. 248/548, 158, 159; 403/361; 52/848; 285/330, 913; 232/17, 38, 39, 1 A, 1 C
See application file for complete search history.

(56) References Cited

U.S. PATENT DOCUMENTS

| | | | | |
|---|---|---|---|---|
| 1,645,802 A * | 10/1927 | Davis | ............................ | 403/354 |
| 2,508,237 A * | 5/1950 | Eserkaln et al. | ............... | 403/315 |
| 2,841,634 A * | 7/1958 | Kimball | ......................... | 52/632 |
| 2,884,274 A * | 4/1959 | Donnell | ........................ | 403/334 |
| 3,031,641 A * | 4/1962 | Camzi | ............................ | 439/851 |
| 3,182,345 A * | 5/1965 | Smith | ............................ | 15/176.6 |
| 3,249,377 A * | 5/1966 | Weasler | ........................ | 403/333 |
| 3,256,031 A * | 6/1966 | Fillweber | ...................... | 403/326 |
| 3,338,605 A * | 8/1967 | Stoeber | ......................... | 403/174 |
| 3,836,267 A * | 9/1974 | Schatz | ........................... | 403/17 |
| 4,247,136 A | 1/1981 | Fouss et al. | | |
| 4,480,855 A | 11/1984 | Rosenbaum | | |
| 4,586,844 A * | 5/1986 | Hammonds et al. | .......... | 403/287 |
| 4,779,902 A * | 10/1988 | Lee | ................................ | 285/260 |
| 4,843,746 A | 7/1989 | DesNoyers et al. | | |
| 4,887,849 A * | 12/1989 | Briet | ................................ | 285/91 |
| 5,050,356 A * | 9/1991 | Johnson et al. | ................. | 52/295 |
| 5,176,406 A * | 1/1993 | Straghan | ......................... | 285/24 |
| 5,188,399 A * | 2/1993 | Durina | ............................ | 285/91 |
| 5,240,292 A * | 8/1993 | Roszin | ............................ | 285/53 |
| 5,400,959 A | 3/1995 | Cone | | |
| 5,662,360 A * | 9/1997 | Guzowski | ...................... | 285/110 |
| 5,664,729 A * | 9/1997 | Ladewig | ......................... | 232/39 |
| 5,971,267 A * | 10/1999 | Beckmann | ....................... | 232/39 |

(Continued)

*Primary Examiner* — Nkeisha Smith
(74) *Attorney, Agent, or Firm* — St. Onge Steward Johnston & Reens LLC (57) ABSTRACT

A support post includes a first tube with a first support face at its end and at least one groove in the first support face. The support post further includes a second tube with a barrel at its end having a diameter smaller than the first tube and dimensionally matched to a hole in the first support face. The second tube further includes at least one track on the barrel that engages the at least one groove and at least one hook on the barrel that engages a flange in the interior of the first tube. The second tube further includes a second support face at an end of the barrel that engages the first support face. The components are dimensioned so as to form a tight fit between the first and second support faces and the hook and flange to prevent bending motion between the first and second tubes.

30 Claims, 6 Drawing Sheets

(56) References Cited

U.S. PATENT DOCUMENTS

| | | | |
|---|---|---|---|
| 6,327,833 B1 * | 12/2001 | Miskelley et al. | 52/848 |
| 6,568,658 B2 | 5/2003 | Strome | |
| 6,893,055 B2 | 5/2005 | Thomas et al. | |
| 7,090,117 B2 * | 8/2006 | Lackey et al. | 232/39 |
| 7,578,087 B2 * | 8/2009 | Tollis et al. | 40/611.07 |
| 2005/0133675 A1 * | 6/2005 | Marshall | 248/159 |
| 2005/0134041 A1 | 6/2005 | Kikumori et al. | |
| 2005/0155209 A1 * | 7/2005 | Isendam et al. | 29/453 |
| 2005/0249550 A1 * | 11/2005 | Liang | 403/348 |
| 2006/0138208 A1 * | 6/2006 | Lackey et al. | 232/39 |
| 2007/0164174 A1 * | 7/2007 | Hung et al. | 248/159 |
| 2008/0093846 A1 * | 4/2008 | Sparks et al. | 285/330 |

* cited by examiner

METHOD FOR ASSEMBLING BLOW MOLDED TUBES

FIELD OF THE INVENTION

The apparatus described herein generally relates to the field of blow-molded tubes; and more directly, coupling systems for multiple blow molded tubes.

BACKGROUND OF THE INVENTION

The use of blow-molding as a method for manufacturing various sorts of articles is well known. Typically, this process involves the use of a mold consisting of two separate halves or portions having cavities of particularly desired shapes and sizes. Usually, the manufacturer extrudes a large-diameter, sealed tube of molten material (usually plastic or polymer; commonly referred to as a "parison"), places the tube between the mold halves, and closes the mold around the tube. Fluid pressure is then introduced into the tube, forcing the molten tube against the walls of the cavities, causing the tube to conform to the shape of the mold. The pressure is maintained until the molten material cools and solidifies. The pressure is then released, the mold halves are pulled apart, and the hardened article is ejected.

The above-described blow-molding process lends itself to the fabrication of tube-like structures. To accomplish this, a cylindrical mold is used and the parison is inserted and inflated within the mold to create a hollow cylinder. The resulting blow-molded tubes are strong, lightweight, inexpensive to manufacture, durable, and reasonably aesthetically pleasing. A large proportion of blow-molded tubes manufactured are designed and used for packaging (i.e. a blow-molded tube being used as a canister to package a product). However, they can also be used as a light or medium duty modular structural element or frame component for semi-permanent structures. For example, blow-molded tubes can be used as a structural backbone for exterior structures such as lawn ornaments, mailboxes, toys, and modular furniture.

When used as a modular structural element, strength and ease of assembly are the primary design objectives. In addition to the tubes themselves being relatively strong, the coupling between tubes must also be strong. This is particularly true if the tube or tubes will be used as a load bearing element.

Such design objectives are difficult to accomplish given the blow-molding process described above. Although it is relatively easy to create a tube by blow-molding, integrating a coupling system into the blow-molded tube is not as simple. One reason is that blow-molding only allows detailed features to be molded on the outer surface of the tube. Manufacturers have previously used separate pieces to connect multiple tubes. This is disadvantageous due to added complexity and cost, the risk of component loss, diminished aesthetics, and potential choking hazards.

As a result of these manufacturing limitations, the integrated coupling systems found on today's blow-molded tubes leave much to be desired in terms of load bearing ability, coupling permanence, and stability of the coupling. Unfortunately, this has prevented the use of coupled blow-molded tubes in applications where they would otherwise be ideally suited due to their low cost and strength to weight ratio. Therefore, there remains a need in the art for a streamlined, elegant, integrated coupling system for blow-molded tubes that is permanent, stable, and can support a heavy load.

SUMMARY OF THE INVENTION

A support post includes a first tube with a first support face at its end and at least one groove in the first support face. The first support face further comprises an opening. The first tube further includes a flange protruding into its interior. The support post further includes a second tube with a barrel at its end having a diameter smaller than the first tube and dimensionally matched to the hole in the first support face. The second tube further includes at least one track on the barrel that engages the at least one groove and at least one hook on the barrel that engages the flange. The second tube further includes a second support face at an end of the barrel that engages the first support face. The distance between the at least one hook and second support face and the distance between the flange and first support face are dimensioned so as to form a tight fit between the first and second support faces and the hook and flange to prevent bending motion between the first and second tubes.

A tube coupling includes a male element on a first tube and a female element on a second tube. The tube coupling further includes at least one groove in the female element and at least one track on the male element that engages the at least one groove. The tube coupling further includes a flange on the female element and at least one hook on the male element that engages the flange on the female element.

A method of coupling tubes includes the steps of inserting a barrel on a second tube into an opening in a first support face at an end of a first tube. The method further includes inserting at least one track on the second tube into at least one groove in the first support face. The method further includes sliding the barrel into the opening and sliding the at least one track in the at least one groove so as to move the first and second tubes toward each other. The method further includes engaging at least one hook on the second tube with a flange protruding into an interior of the first tube. The method further includes engaging the first support face with a second support face at the end of the barrel on the second tube.

DETAILED DESCRIPTION OF THE INVENTION

Figure 1:
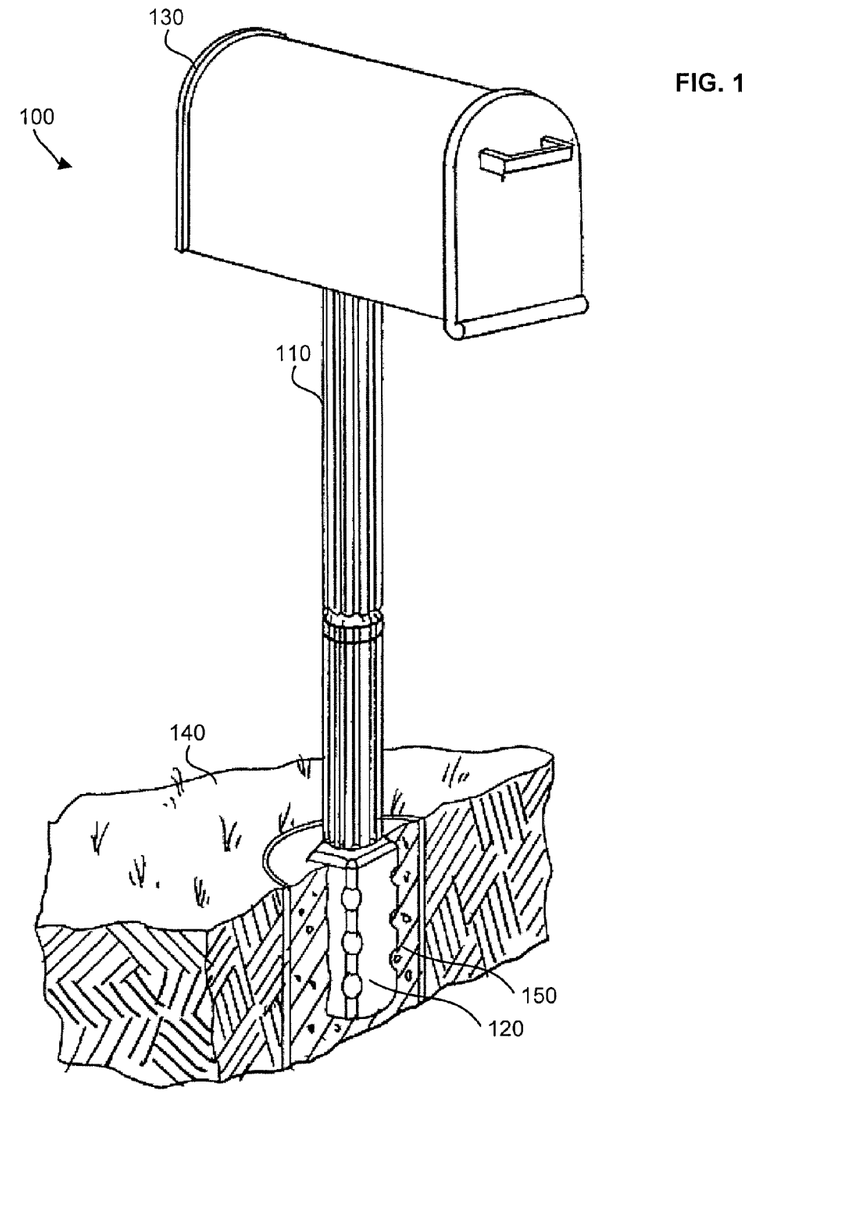
FIG. 1 is one embodiment of the coupling system being used on a pair of tubes being used as a pillar for a mailbox.
Figure 2:
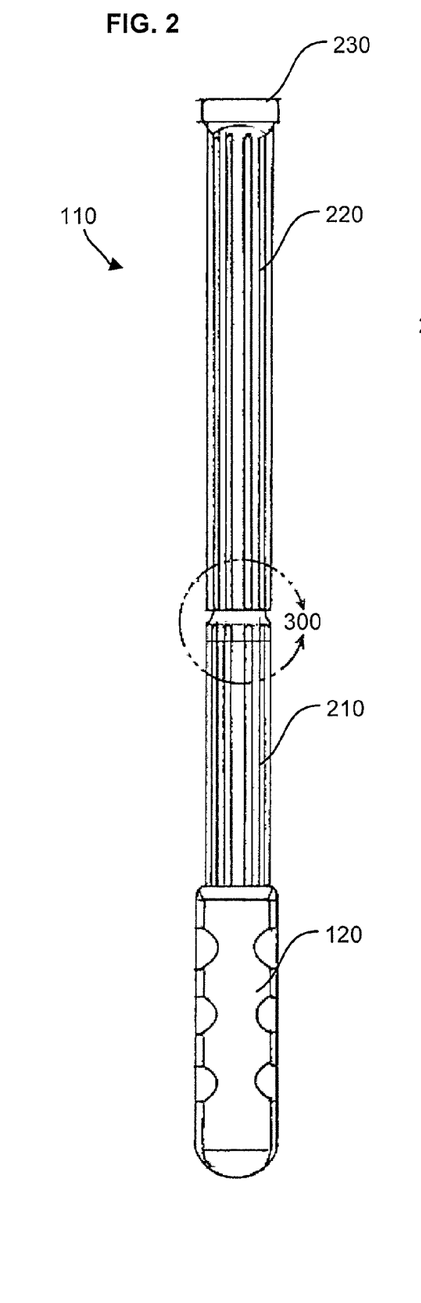
FIG. 2 is the coupling system being used on an assembled mailbox pillar as shown in FIG. 1.

FIG. 1 shows a mailbox 100 featuring a post 110 in one possible application of the coupling system. FIG. 2 shows the post 110 prior to assembly into mailbox 100. Post 110 comprises stud 120 which is buried in FIG. 1 in a pit 150 filled with concrete. This anchors mailbox 100 to the ground 140. Post 110 also comprises platform 230 which is bolted to the box portion 130 of mailbox 100. Post 110 comprises upper tube 220 and lower tube 210 coupled together. It is convenient to be able to ship upper tube 220 and lower tube 210 to the consumer in separate pieces because the assembled post 110 is approximately 1.5 meters long and would be awkward to transport and package. Thus a coupling system is advantageous. In the embodiment shown, post 110 comprises fluting on the exterior. This improves aesthetics and provides a small amount of additional structural strength.

Figure 3:
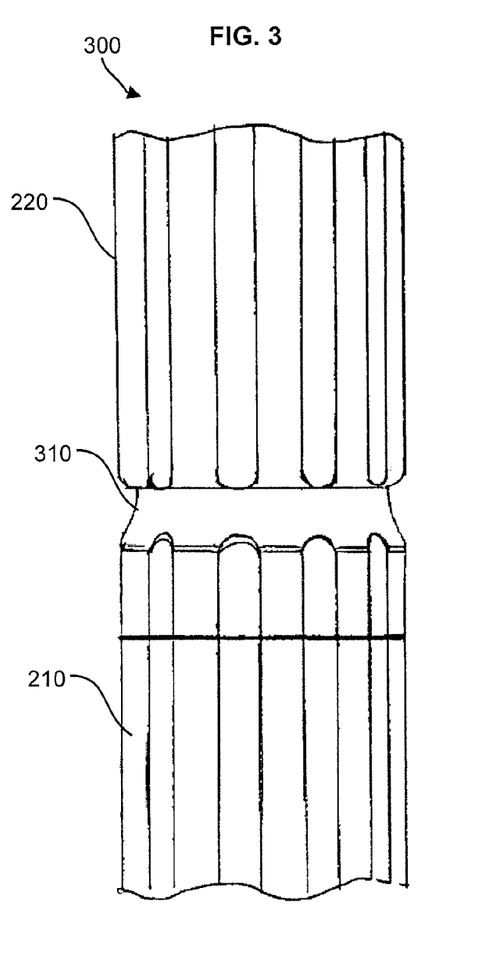
FIG. 3 is as close-up of the assembled coupling of FIG. 2.

FIG. 3 shows a close-up of the coupling 300 featured on post 110 in FIGS. 1 and 2. Coupling 300 couples lower tube 210 and upper tube 220. Upper tube 220 comprises flange 310, which in this embodiment is in the form of a circumferential annular groove. Upper tube 220 and lower tube 210 have circular cross-sections in this embodiment, but may have other cross-sectional shapes (e.g. hexagonal, square, octagonal).

Figure 4:
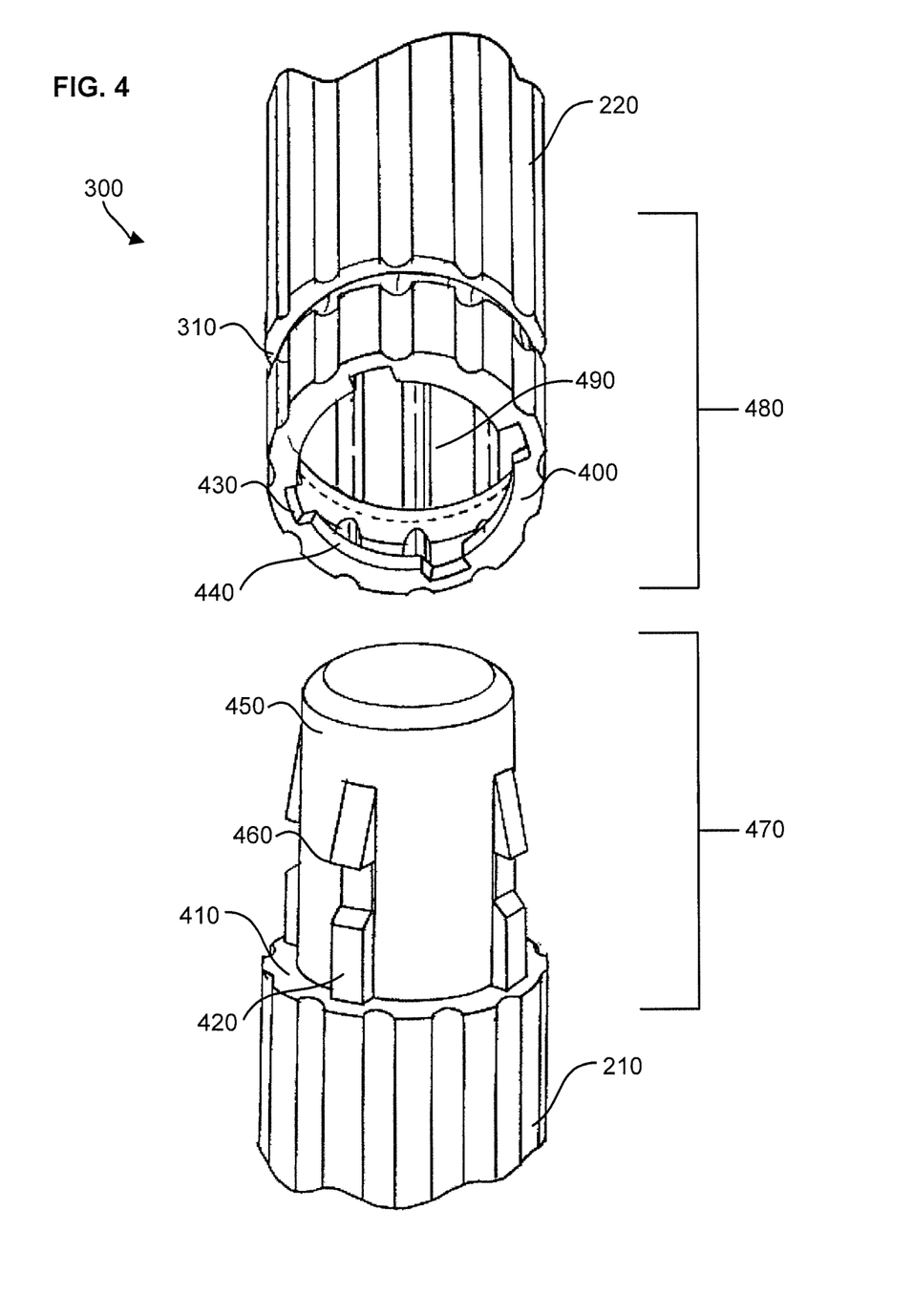
FIG. 4 is a close-up of the disassembled coupling of FIG. 2.

FIG. 4 shows upper tube 220 and lower tube 210 separated from one another. In FIG. 4, the operative features of coupling 300 can be clearly seen.

Upper tube 220 comprises female element 480. Female element 480 comprises grooves 430 and flange 310. Female element 480 further comprises first support face 400 at its distal end. Female element 480 further comprises protruding portions 440 in first support face 400. Protruding portions 440 and grooves 430 form opening 490 in first support face 400.

Lower tube 210 comprises male element 470. Male element 470 includes tracks 420 and hooks 460. In this embodiment, hooks 460 are formed as part of tracks 420. In this embodiment, tracks 420 and hooks 460 are disposed on barrel 450. Male element 470 further comprises a second support face 410 on the proximal end of barrel 450.

In this embodiment, there are four tracks 420, four hooks 460, and four grooves 430. There are also four protruding portions 440 resulting from the inclusion of four grooves 430.

In order to couple upper tube 220 and lower tube 210, a user inserts male element 470 into female element 480. This is accomplished by inserting distal end of barrel 450 of lower tube 210 into opening 490 of upper tube 220. As barrel 450 is inserted into opening 490, protruding portions 440 on upper tube 220 engage barrel 450 on lower tube 210. Barrel 450 has a smaller diameter than upper tube 220 and a smaller or approximately equal diameter to opening 490 in order to permit insertion of barrel 450 into opening 490. Lower tube 210 and upper tube 220 are slid toward each other, engaging grooves 430 with tracks 420. As lower tube 210 is further slid toward upper tube 220, tracks 420 approach flange 310 inside upper tube 220. In this embodiment, tracks 420 are tapered at a distal end to allow for easier engagement of flange 310. As upper tube 220 and lower tube 210 approach a coupled position, hooks 460 engage flange 310 "snapping" the tubes into place. Simultaneously, first support face 400 engages second support face 410.

Certain design features of male element 470 and female element 480 allow for manual coupling of the two tubes by lowering the force required to couple the tubes. The circular shape of flange 310 resists distortion when it is engaged by hooks 460 on male element 470. However, the leading edges of hooks 460 have a gradual taper to create gradual distortion of flange 310 as the tubes are coupled; thus the coupling force is low enough to facilitate coupling the tubes by hand. Hooks 460 are sufficiently narrow to distort barrel 450 significantly during coupling, which further lowers the force required for coupling.

Figure 5:
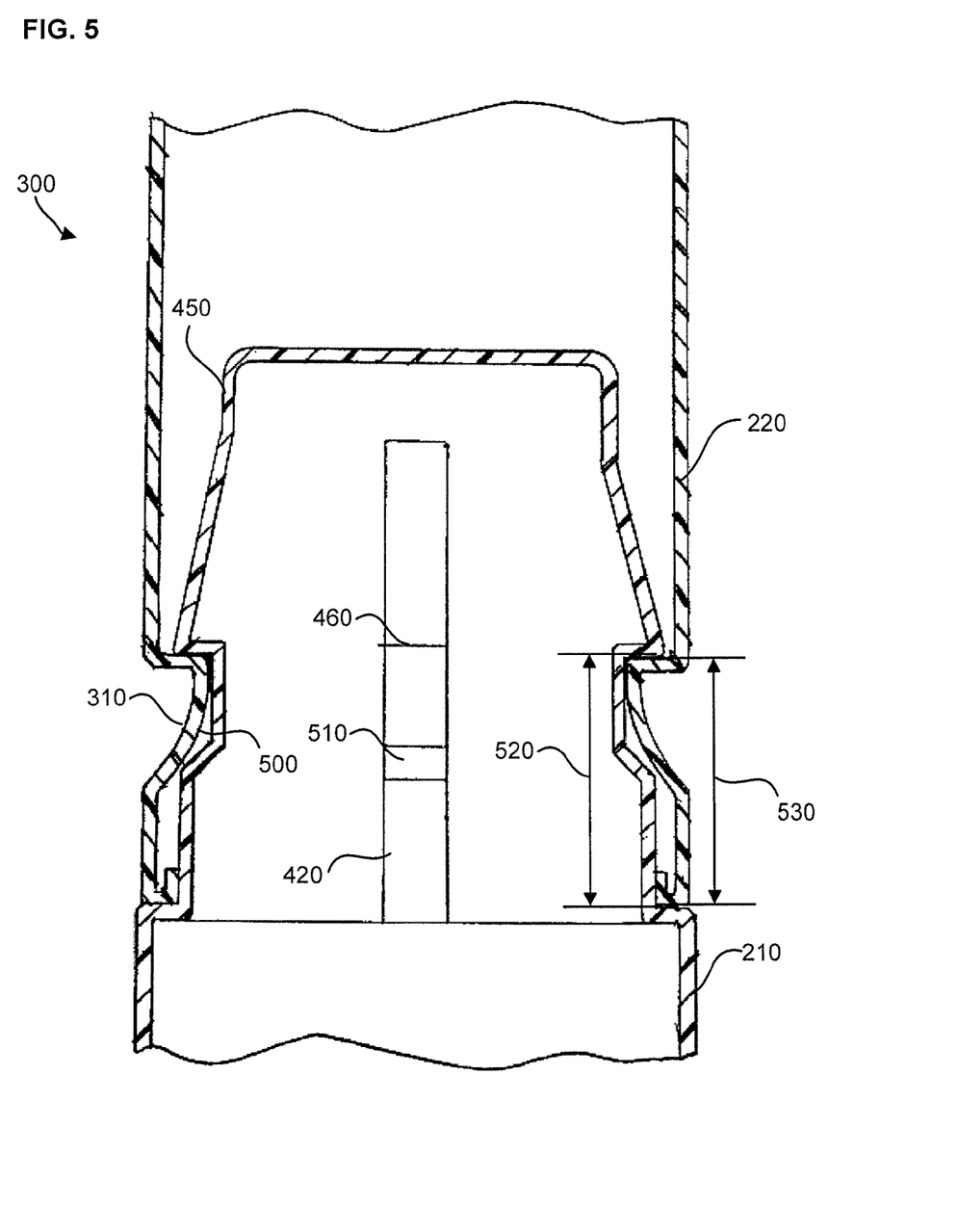
FIG. 5 is a sectional view of the assembled coupling of FIG. 2.

The result of this coupling is an interference or press fit between hooks 460 and flange 310 and first support face 400 and second support face 410. In other words, the first distance 520 between the engagement faces of hooks 460 and second support face 410 is approximately equal to or slightly smaller than the second distance 530 between engagement face of flange 310 and first support face 400. This is at least true before lower tube 210 and upper tube 220 are coupled. After coupling, first distance 520 will be forced to be at least equal to second distance 530 in order couple the tubes. Thus, once hooks 460 engage flange 310, first support face 400 and second support face 410 are forced against one another in a tight engagement. The engagement between first support face 400 and second support face 410 in turn ensures a tight engagement between hooks 460 and flange 310. In other words, flange 310 and first support face 400 are trapped between hooks 460 and second support face 410.

Figure 6:
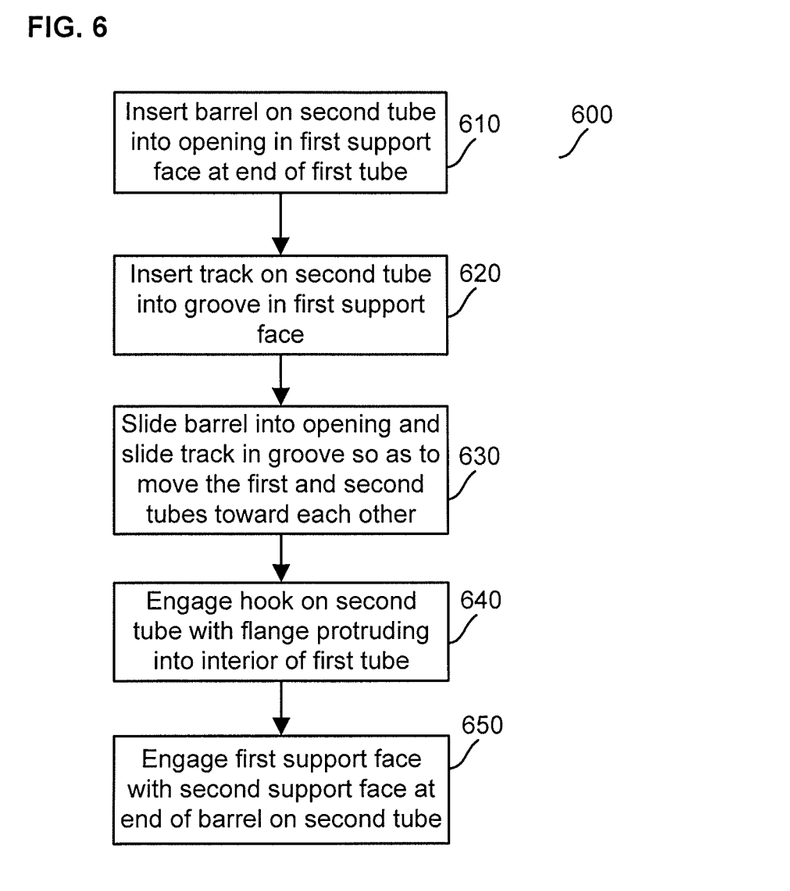
FIG. 6 is a method of coupling tubes according to one embodiment.
Figure 7A:
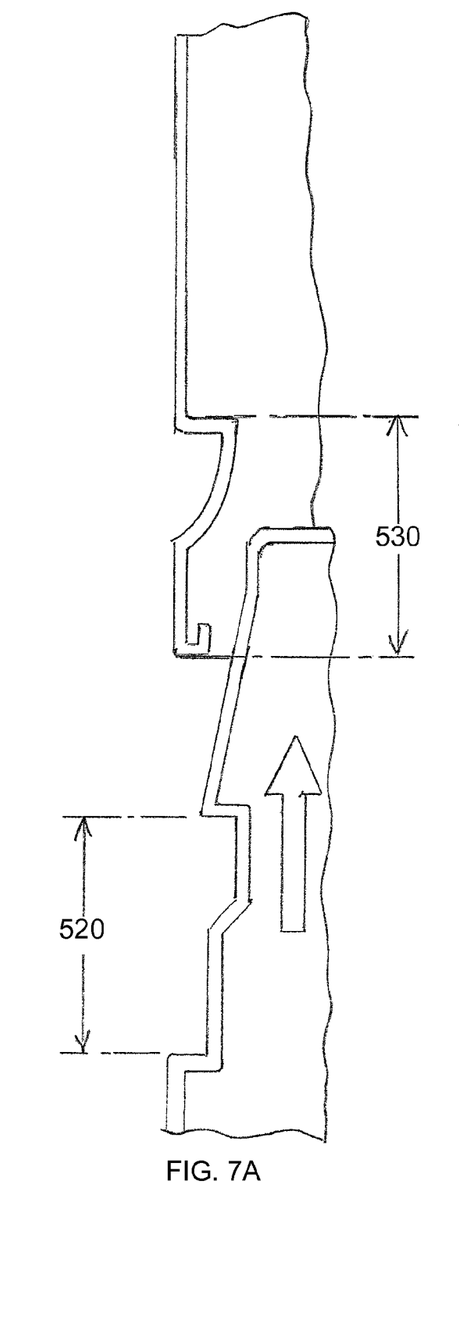
FIGS. 7A and 7B respectively show partial sectional views of the tubes prior to and after assembly.
Figure 7B:
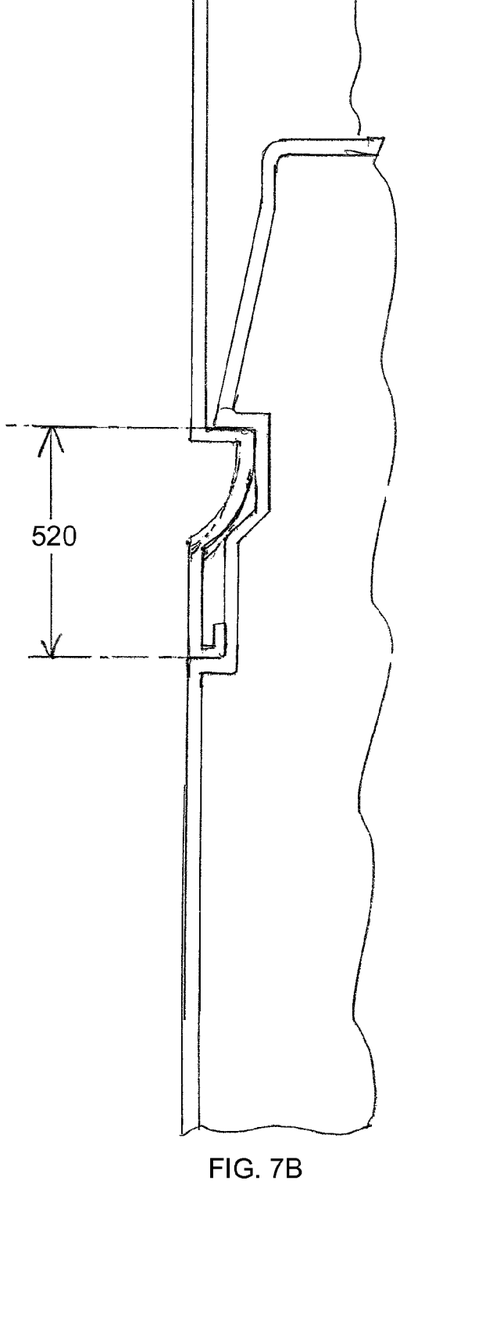

As shown in FIG. 6, a method of coupling tubes 600 includes the steps of inserting a barrel on a second tube into an opening in a first support face at an end of a first tube 610. The method further includes inserting at least one track on the second tube into at least one groove in the first support face 620. The method further includes sliding the barrel into the opening and sliding the at least one track in the at least one groove so as to move the first and second tubes toward each other 630. The method further includes engaging at least one hook on the second tube with a flange protruding into an interior of the first tube 640. The method further includes engaging the first support face with a second support face at the end of the barrel on the second tube 650.

Once coupled, the tubes are nearly impossible to separate because of the shape of hooks 460 and flange 310. However it is relatively easy to couple the tubes due to the taper at the front of tracks 420 (or hooks 460). Furthermore, coupling 300 allows no relative movement of the tubes in any direction (i.e. rotation; axial extension or compression; bending). This is true because there are four types of engagement between male element 470 and female element 480 once coupled. These include the engagement between tracks 420 and grooves 430, the engagement between barrel 450 and protruding portions 440, the engagement between hooks 460 and flange 310, and the engagement between first support face 400 and second support face 410.

Specifically, the engagement between tracks 420 and grooves 430 prevents relative rotational motion between upper tube 220 and lower tube 210. The engagement between hooks 460 and flange 310 prevents axial extension between upper tube 220 and lower tube 210. The engagement between first support face 400 and second support face 410 prevents axial compression between upper tube 220 and lower tube 210. Hooks 460, second support face 410, flange 310, and first support face 400 are spaced and dimensioned to create a tight engagement between first support face 400 and second support face 410 when coupled. The engagement of the support faces ensures proper alignment of the tubes and a properly oriented coupling between hooks 460 and flange 310. The close abutment of the support faces also prevents bending motion between upper tube 220 and lower tube 210.

These multiple simultaneous engagements in multiple orientations have the further advantage of providing structural and load-bearing strength to coupling 300. The interface between first support face 400 and second support face 410 can support a substantial compressive vertical load. Furthermore the lower portion 500 of flange 310 and the lower portion 510 of tracks 420 (located below the portions formed into hooks) can also create a vertical engagement point and further support a compressive vertical load. Therefore, the combination of the hook/flange engagement and the engagement between the support faces can support a substantial vertical load.

Coupling 300 described herein is designed for use with blow-molded tubes. Typically blow-molding involves inserting a soft polymer tube into a mold, inflating it and allowing it to harden in the shape of the mold. Therefore detailed features can only be created on the outer surface of the tube. The coupling described herein can be manufactured by only creating features within the mold that are imprinted on the exterior of the tube. Male element 470 is formed on the outside of lower tube 210 and female element 480 is made from the interior of upper tube 220 by molding the exterior of upper tube 220. This is particularly apparent with flange 310 which is technically an exterior feature of upper tube 220, but because it protrudes into the interior of upper tube 220, it is functionally a feature of the interior because it functions to engage hooks 460 inside female element 480. Using a punch to create opening 490 allows precise dimensioning so that it can tightly engage barrel 450. Opening 490 can be formed using an "in-mold punch" or an additional post-mold punch.

Although the invention has been described with reference to embodiments herein, those embodiments do not limit the scope of the invention. Modifications to those embodiments or different embodiments may fall within the scope of the invention.

What is claimed is:

1. A support post comprising:
   a first tube comprising a first support face at its end;
   at least one groove in the first support face;
   an opening in the first support face;
   a flange protruding into an interior of the first tube;
   a second tube comprising a barrel at its end having a diameter smaller than the first tube and dimensionally matched to the opening in the first support face;
   at least one track on the barrel that engages the at least one groove;
   at least one hook on the barrel that engages the flange;
   a second support face at an end of the barrel that engages the first support face;
   a first distance between the at least one hook and the second support face and a second distance between the flange and the first support face being dimensioned so as to form a tight fit between the first and second support faces and the hook and flange to resist bending motion between the first and second tubes;
   wherein the at least one hook is located on the at least one track;
   wherein the flange is a circumferential groove protruding into the interior of the first tube; and
   wherein the tight fit is formed by compression of the first tube against the second tube and during coupling the flange distorts such that prior to coupling the first and second tubes the first distance is smaller than the second distance and after coupling, the first distance is substantially equal or greater than the second distance.

2. The support post of claim 1, wherein the first tube comprises at least two grooves and the second tube comprises at least two tracks.

3. The support post of claim 2, wherein the first tube comprises four grooves and the second tube comprises four tracks and four hooks.

4. The support post of claim 1, wherein a portion of the first support face engages the barrel.

5. The support post of claim 1, wherein the first and second tubes are polymer.

6. The support post of claim 1, wherein the first and second support faces, the at least one groove, the flange, the barrel, the at least one track, and the at least one hook are constructed from features on outer surfaces of the first and second tubes.

7. The support post of claim 1, wherein the barrel has a smaller diameter than the second tube.

8. The support post of claim 1 wherein the first and second tubes are formed by blow molding.

9. A tube coupling comprising:
   a female element on a first tube;
   a male element on a second tube;
   at least one groove in the female element;
   at least one track on the male element that engages the at least one groove;
   a flange defined by an indentation in an outer surface of the first tube protruding into an interior of the female element;
   at least one hook on the male element that engages the flange on the female element; and
   wherein the first tube is adapted to engage the second tube to cause compression of the first tube against the second tube such that after coupling of the first and second tubes a distance from the flange to an end of the first tube is forced to be substantially equal to or less than another distance measured between the male element and an engagement face on said second tube.

10. The tube coupling of claim 9, further comprising:
    a first support face at the distal end of the female element; and
    a second support face at the proximal end of the male element that engages the first support face.

11. The tube coupling of claim 9, further comprising:
    a barrel on the male element that the at least one track and the at least one hook are disposed on.

12. The tube coupling of claim 11, wherein a portion of the female element engages the barrel.

13. The tube coupling of claim 9, wherein the at least one hook is located on the at least one track.

14. The tube coupling of claim 9, wherein the male element comprises at least two tracks and the female element comprises at least two grooves.

15. The tube coupling of claim 14, wherein the male element comprises four tracks and four hooks, and the female element comprises four grooves.

16. The tube coupling of claim 9, wherein the flange is a circumferential groove protruding into the interior of the female element.

17. The tube coupling of claim 9, wherein the first and second tubes are polymer.

18. The tube coupling of claim 9, wherein the male and female elements are constructed from features on outer surfaces of the first and second tubes.

19. The support post of claim 9, wherein the male element has a smaller diameter than the first tube.

20. The tube coupling claim 9 wherein the first and second tubes are formed by blow molding.

21. A method of coupling tubes, comprising the steps of:
    (a) inserting a barrel on a second tube into an opening in a first support face at an end of a first tube;
    (b) inserting at least one track on the second tube into at least one groove in the first support face;
    (c) sliding the barrel into the opening and sliding the at least one track in the at least one groove so as to move the first and second tubes toward each other into a position where the barrel and track are completely contained within the first tube;
    (d) forcing the first tube and second tubes together to compress the first tube;
    (e) engaging at least one hook on the second tube with a flange protruding into an interior of the first tube in a manner that leaves the at least one track and the at least one groove engaged to each other wherein said forcing step causes distortion of the flange and a distance between an engagement face of the flange and the first support face to be substantially equal to or less than another distance measured between the at least one hook and the second support face; and
    (f) engaging the first support face with a second support face at the end of the barrel on the second tube.

22. The method of claim 21, wherein step (a) comprises engaging the first support face with the barrel.

23. The method of claim 21, wherein the at least one track is disposed on the barrel.

24. The method of claim 21, wherein second tube comprises at least two tracks and the first tube comprises at least two grooves.

25. The method of claim 24, wherein the second tube comprises four tracks and four hooks, and the first tube comprises four grooves.

26. The method of claim 21, wherein the flange is a circumferential groove protruding into the interior of the first tube.

27. The method of claim 21, wherein the at least one hook is located on the at least one track.

28. The method of claim 21, wherein the tubes are polymer.

29. The method of claim 21, wherein the first and second support faces, the at least one groove, the flange, the barrel, the at least one track, and the at least one hook are constructed from features on outer surfaces of the first and second tubes.

30. The method of claim 21 wherein the first and second tubes are formed by blow molding.

\* \* \* \* \*